United States Patent
Yamamoto et al.

(10) Patent No.: US 6,796,280 B2
(45) Date of Patent: Sep. 28, 2004

(54) INTAKE AIR CONTROL VALVE

(75) Inventors: Hiroki Yamamoto, Obu (JP); Tadashi Yamaguchi, Saga-ken (JP)

(73) Assignees: Aisan Kogyo Kabushiki Kaisha, Aichi (JP); NOK Corporation, Tokyo (JP)

( * ) Notice: Subject to any disclaimer, the term of this patent is extended or adjusted under 35 U.S.C. 154(b) by 0 days.

(21) Appl. No.: 10/664,974

(22) Filed: Sep. 22, 2003

(65) Prior Publication Data

US 2004/0055565 A1 Mar. 25, 2004

(30) Foreign Application Priority Data

Sep. 25, 2002 (JP) ........................................ 2002-279178

(51) Int. Cl.⁷ ............................................... F02B 27/02
(52) U.S. Cl. .............................. 123/184.36; 123/184.49
(58) Field of Search ....................... 123/184.36, 184.44, 123/184.49; 277/591

(56) References Cited

U.S. PATENT DOCUMENTS

| | | | | |
|---|---|---|---|---|
| 4,803,961 A | * | 2/1989 | Hiraoka et al. | 123/184.36 |
| 5,027,769 A | * | 7/1991 | Yoshida et al. | 123/399 |
| 6,722,335 B2 | * | 4/2004 | Nomura et al. | 123/184.59 |

FOREIGN PATENT DOCUMENTS

JP          06-039052 Y2   10/1994

* cited by examiner

*Primary Examiner*—Marguerite McMahon
(74) *Attorney, Agent, or Firm*—Rader, Fishman & Grauer PLLC

(57) ABSTRACT

An intake air control valve of the invention has a valve body and a valve holder, and is attached to a communication hole on a partition wall separating a surge tank chamber within a surge tank of a multiple cylinder internal combustion engine by fitting and inserting a valve holder. A valve hole is formed within the valve holder, and a butterfly type valve body is attached via a valve shaft so as to freely open and close a valve hole. A seal member is fitted to a groove provided in a peripheral edge portion of the valve holder. The seal member is formed by a fitting and attaching portion fitted and attached to an inner side of the groove of the valve holder and a leading end seal portion brought into contact with an inner peripheral portion of the communication hole in the partition wall. Recess portions open to an inner side of the groove is provided in the fitting and attaching portion in parallel in a longitudinal direction so as to be sectioned by a plurality of ribs. Accordingly, it is possible to prevent the seal member fitted to a peripheral edge portion of the valve holder from falling away and it is possible to secure a good sealing property at a time of full closing.

8 Claims, 11 Drawing Sheets

INTAKE AIR CONTROL VALVE

BACKGROUND OF THE INVENTION

1. Field of the Invention

The present invention relates to an intake air control valve attached to a communication hole on a partition wall provided in a surge tank of a multiple cylinder internal combustion engine via a seal member, and relates to a seal member used there.

2. Description of Related Art

In conventional, in a multiple cylinder internal combustion engine, there has been known an intake air apparatus in which a partition wall is formed in an inner portion of a surge tank, a first surge tank chamber and a second surge tank chamber are formed within the surge tank, an intake air control valve is arranged in a communication hole formed on the partition wall, the first surge tank chamber and the second surge tank chamber are separated by fully closing the intake air control valve, and the first surge tank chamber and the second surge tank chamber are communicated with each other by fully opening the intake air control valve.

This intake air apparatus controls the intake air control valve so as to fully close or fully open the intake air control valve in correspondence to a high load low speed operation of the internal combustion engine or a low load high speed operation of the internal combustion engine, thereby changing an equivalent pipe length of an intake air passage. Thus, the intake air apparatus is controlled so as to secure a high charging efficiency all over an entire rotating speed area of the internal combustion engine by utilizing an intake air inertia effect.

In the intake air control valve used in this kind of intake air apparatus, if an air leakage is generated at a time when the intake air control valve is fully closed, the intake air inertia effect is weakened and it is impossible to sufficiently increase the charging effect. Accordingly, a high sealing property is required at a time when the intake air control valve is fully closed, and a valve body (a butterfly valve) of the intake air control valve is structured such that a high sealing property can be obtained at the time of full closing mentioned above.

Further, in an actual surge tank, in the case of attaching the intake air control valve mentioned above to the communication hole on the partition wall of the surge tank, it is necessary to assemble while securing a high sealing property. Therefore, in conventional, there is employed a structure in which this kind of intake air control valve is provided with a valve holder, a butterfly valve is rotatably attached to a valve hole provided within the valve holder by a valve shaft, and the valve holder is attached so as to be fitted to a communication hole (a notch-like opening portion) provided on the partition wall of the surge tank (refer, for example, to Japanese Utility Model Publication No. 6-39052). Further, the structure is made such that a groove is formed in a periphery of the valve holder, a string-like seal member is fitted to the groove, and the string-like seal member seals between an outer peripheral portion of the valve holder and an opening portion of the partition wall.

However, the string-like seal member fitted and attached to the periphery of the valve holder of this kind of conventional intake air control valve is used in a comparatively long part. Accordingly, in the case of using a general rubber seal member provided with a groove and a fin-like seal portion, there is a risk that the attaching position of the seal member is displaced due to a vibration of the engine, and the seal member falls away from the groove. Further, in the case of using the string-like seal member having a simple cross sectional shape with a great elastic deformation resistance, a reaction force applied to the valve holder from the seal member becomes large at a time of attaching the valve holder to the opening portion of the partition wall, whereby there is a problem that a deformation is generated in the valve holder and the sealing property at the time of full closing is deteriorated.

SUMMARY OF THE INVENTION

In order to achieve the object mentioned above, in accordance with the present invention, there is provided an intake air control valve in which a partition wall separating a surge tank chamber is formed in an inner portion of a surge tank of a multiple cylinder internal combustion engine, an intake air control valve having a valve holder and independently formed from the partition wall is attached by fitting and inserting the valve holder to a communication hole formed on the partition wall, a valve hole is formed within the valve holder, a butterfly-shaped valve body is pivoted via a valve shaft so as to freely open and close the valve hole, and a seal member is fitted to a groove provided in a peripheral edge portion of the valve holder, wherein the seal member is formed by a fitting and attaching portion fitted and attached to the groove of the valve holder, and a leading end seal portion brought into contact with an inner peripheral portion of the communication hole on the partition wall, and recess portions open to an inner side of the groove are provided in parallel in a longitudinal direction in the fitting and attaching portion so as to be separated by a plurality of ribs.

An object of the present invention is to provide an intake air control valve which can prevent the seal member fitted and attached to the peripheral edge portion of the valve holder from falling away and can secure an improved sealing property at a time of full closing, on the basis of the structure mentioned above.

The intake air control valve having the structure mentioned above is mounted to the communication hole provided on the partition wall within the surge tank in an intake air system of the multiple cylinder internal combustion engine so as to fit and attach the valve holder thereto. At this time, the valve holder of the intake air control valve brings the leading end seal portion of the seal member fitted and attached to the groove in the peripheral edge portion of the valve holder into contact with the inner side of the communication hole close to the partition wall, thereby sealing between the partition wall and an outer peripheral portion of the valve holder.

At this time, since the recess portions open to the inner side of the groove are sectioned by a plurality of ribs so as to be arranged in parallel in the longitudinal direction, the fitting and attaching portion of the seal member fitted and attached to the groove of the peripheral edge portion of the valve holder is held within the groove in a fitted and attached state with a proper elastic force. Therefore, it is possible to prevent the seal member from falling away due to the vibration or the like.

Further, an elastic force of the seal member, that is, a reaction force applied to the valve holder by the seal member, at a time when the fitting and attaching portion is fitted and attached to the inner side of the groove or at a time when the valve holder is fitted to the communication hole, is reduced to a suitable magnitude by the recess portions provided in the fitting and attaching portion of the seal member and the ribs arranged between the recess portions. Accordingly, at a time of fitting the valve holder into the communication hole, the valve holder is not deformed by the reaction force applied by the seal member. Therefore, it is possible to prevent the valve holder from being deformed, it is possible to hold the seal member in the proper seal position, and it is possible to secure a high sealing property at a time when the valve body within the valve holder is fully closed.

DESCRIPTION OF THE PREFERRED EMBODIMENTS

A description will be given below of the present invention on the basis of an embodiment shown in the accompanying drawings. In this case, this invention is not limited to the embodiment. Every modifications within the scope of claims or equivalent to the scope will be included within the scope of claims.

Figure 1:
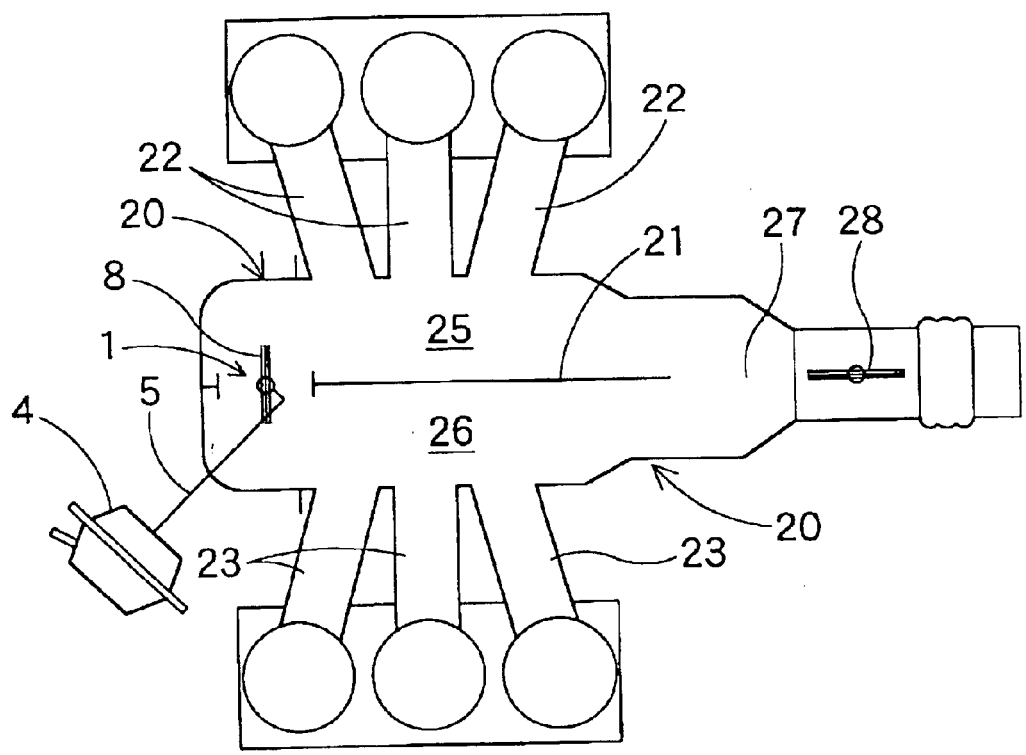
FIG. 1 is a schematic view of an outline structure of an internal combustion engine using an intake air control valve near a surge tank.
Figure 2:
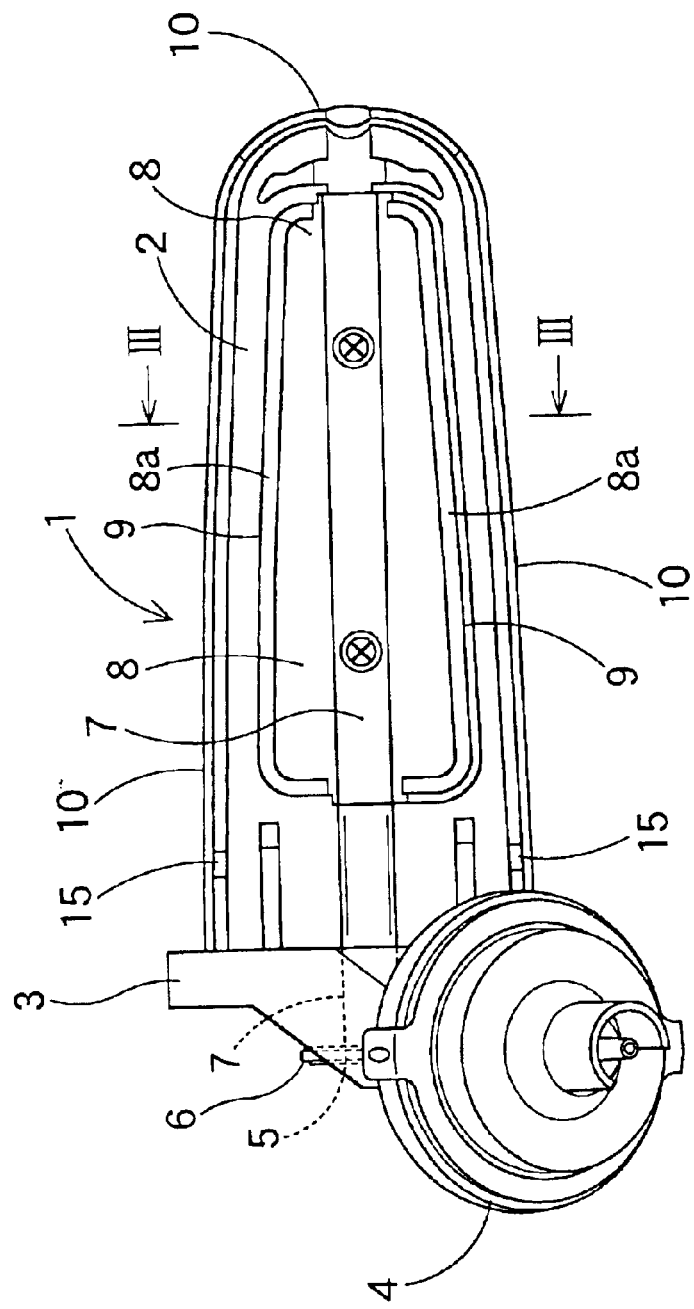
FIG. 2 is a plan view of an intake air control valve 1.

FIG. 1 is a schematic view of an outline structure of an intake air control valve 1 arranged near a surge tank 20 of an intake air system in a six-cylinder internal combustion engine, and FIG. 2 is a plan view of the intake air control valve 1. Two groups of intake air branch pipes 22 and 23 each having three pipes are connected to the surge tank 20 so as to be communicated with each other, and a partition wall 21 is provided within the surge tank 20. A first surge tank chamber 25 communicated with three intake air branch pipes 22 and a second surge tank chamber 26 communicated with the other three intake air branch pipes 23 are formed so as to be divided by the partition wall 21.

Figure 14:
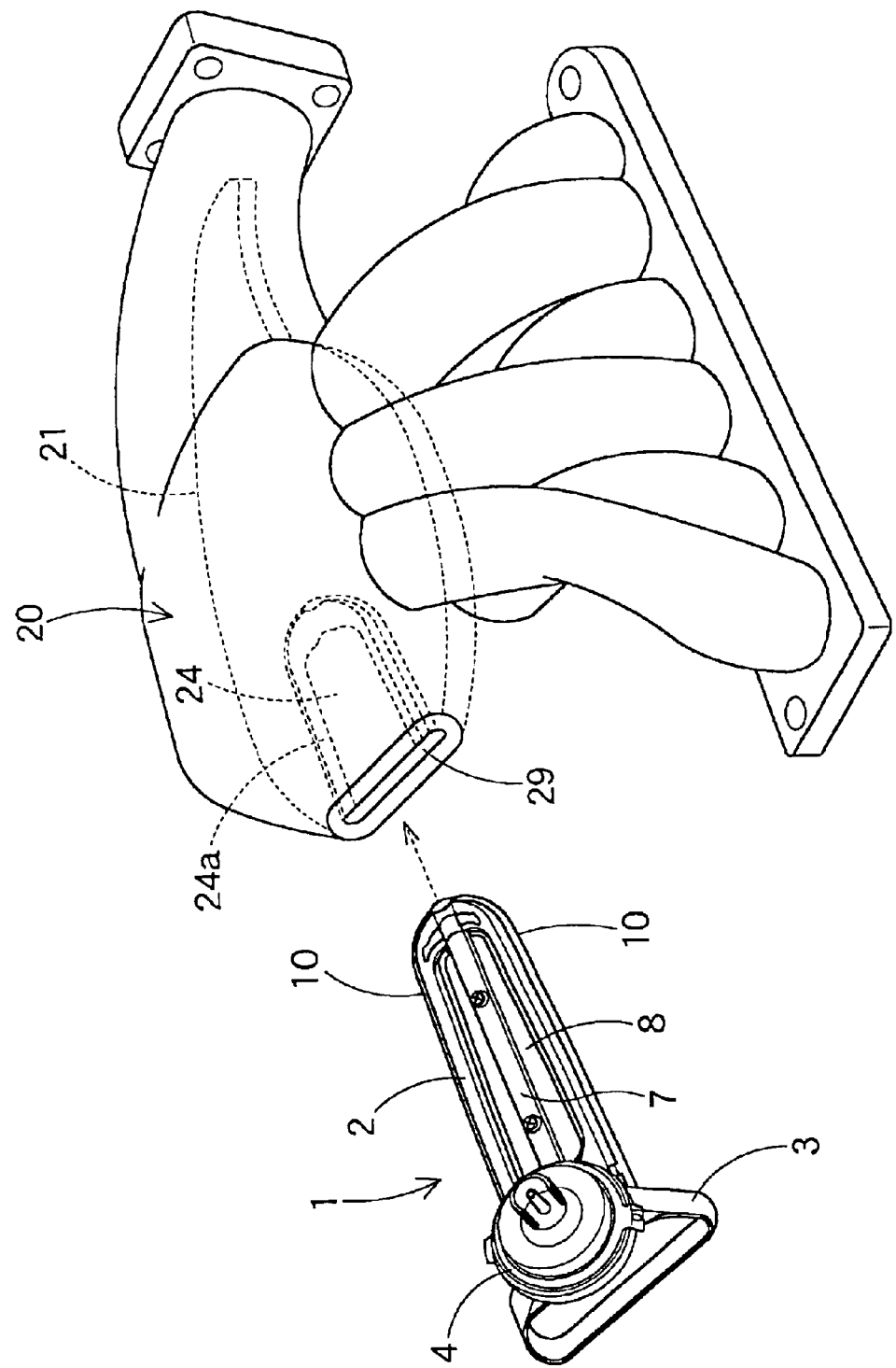
FIG. 14 is a perspective view of an outline structure at a time of attaching the intake air control valve to the surge tank.

A trapezoidal communication hole 24 is formed as a notch-shaped opening portion in an end portion of the partition wall 21 sectioning an inner portion of the surge tank 20, as shown in FIG. 14, a groove portion is provided in a peripheral edge portion of the communication hole 24, and a valve holder 2 of the intake air control valve 1 is fitted and attached to the groove portion via a seal member 10 mentioned below.

As shown in FIG. 14, an opening portion 29 for inserting and mounting the intake air control valve 1 is formed in an end portion of the surge tank 20, and the trapezoidal communication hole 24 is formed in an end portion of the partition wall 21 coming next to the opening portion 29. A shallow groove portion 24a is formed in a longitudinal direction of a peripheral edge portion of the communication hole 24 (an edge portion of the partition wall 21), and the seal member 10 in the peripheral edge of the valve holder 2 is brought into contact with the groove portion 24a. The trapezoidal communication hole 24 is formed such that a front portion is wide and a width of a back portion is narrow, and each of corner portions is formed in a round curve shape.

The partition wall 21 within the surge tank 20 ends with an upstream side of the surge tank 20, that is, a portion to which a throttle body is connected, as shown in FIG. 1. In the case of viewing from an upstream side of the intake air passage, a branch portion 27 of the intake air is formed in this portion, and the intake air is branched into two lines via the branch portion 27. A throttle valve 28 is arranged within the throttle body.

The intake air control valve 1 is constituted, as shown in FIGS. 2 to 5, by a mounting portion 3 mounted so as to close the opening portion 29 of the surge tank 20, a valve holder 2 provided so as to vertically protrude sideward from a mounting surface of the mounting portion 3, a diaphragm type actuator 4 fixed to an end portion of the mounting portion 3, and a butterfly type valve body 8 pivoted via a valve shaft 7 so as to open and close an approximately trapezoidal valve hole 9 formed in an inner side of the valve holder 2.

Figure 5:
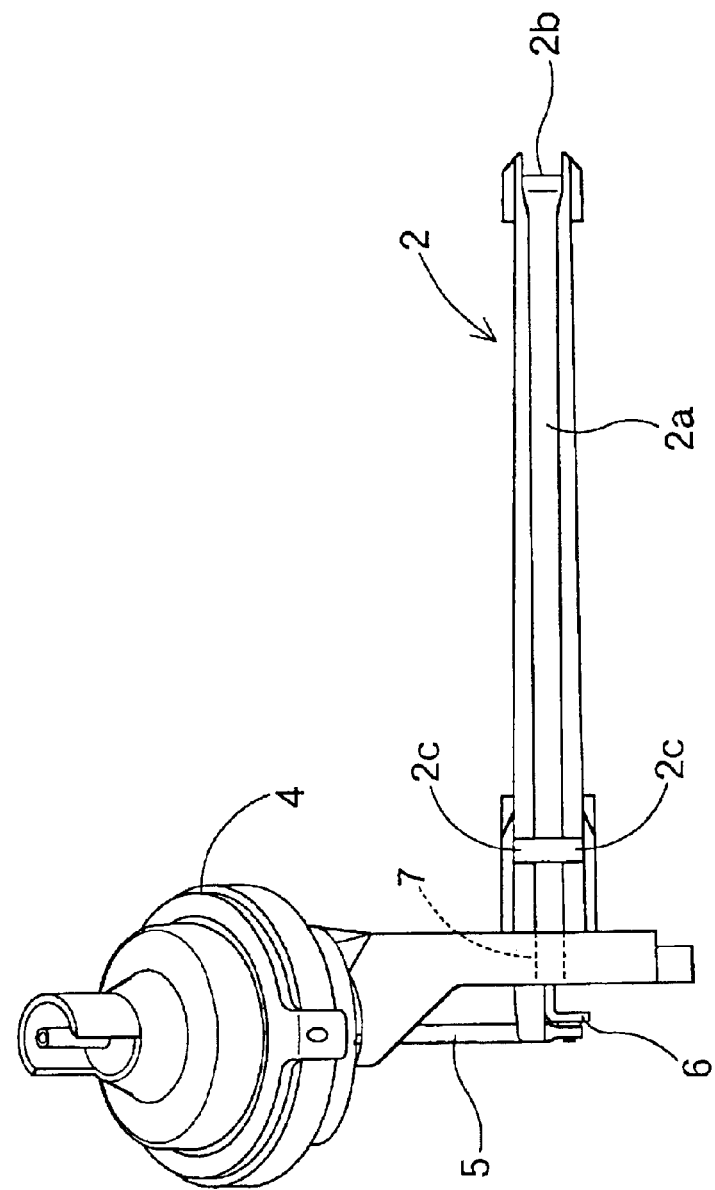
FIG. 5 is a front elevational view of a state in which the seal member 10 of the valve holder 2 is taken out.

As shown in FIGS. 2 and 5, a terminal end of the valve shaft 7 axially supporting the valve body 8 protrudes to an outer side of the mounting portion 3, a lever 6 is fixed to an end portion of the valve shaft 7, and a rod 5 mounted as an output shaft of the actuator 4 is connected to an end portion of the lever 6. The rod 5 moves in an axial direction in accordance with an operation of the actuator 4, rotates the lever 6 and rotates the valve shaft 7, thereby opening and closing the butterfly type valve body 8. A rubber seal member 8a is fitted and attached to an outer peripheral portion of the valve body 8.

The valve holder 2 is formed in the same shape as that of the communication hole 24 in such a manner that the valve holder is inserted into the surge tank 20 from the opening portion 29, and is fitted and attached to the communication hole 24 (the approximately trapezoidal opening portion) coming next to the opening portion 29 in an airtight manner, as shown in FIG. 14. A groove 2a for a seal member is continuously formed in a peripheral edge portion of the valve holder 2 in a longitudinal direction, and a seal member 10 as shown in FIGS. 7 to 13 is fitted into the groove 2a.

Figure 6:
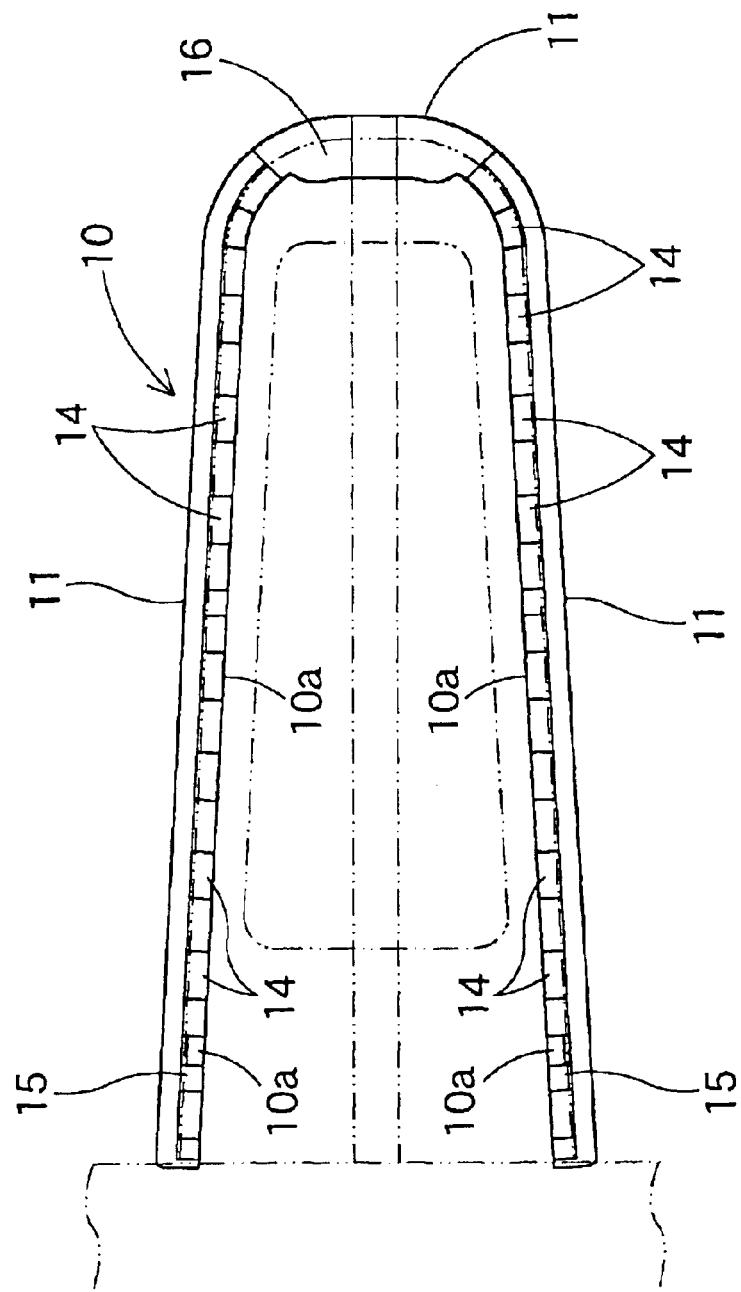
FIG. 6 is a plan view of the seal member 10 in a state of being taken out.
Figure 7:
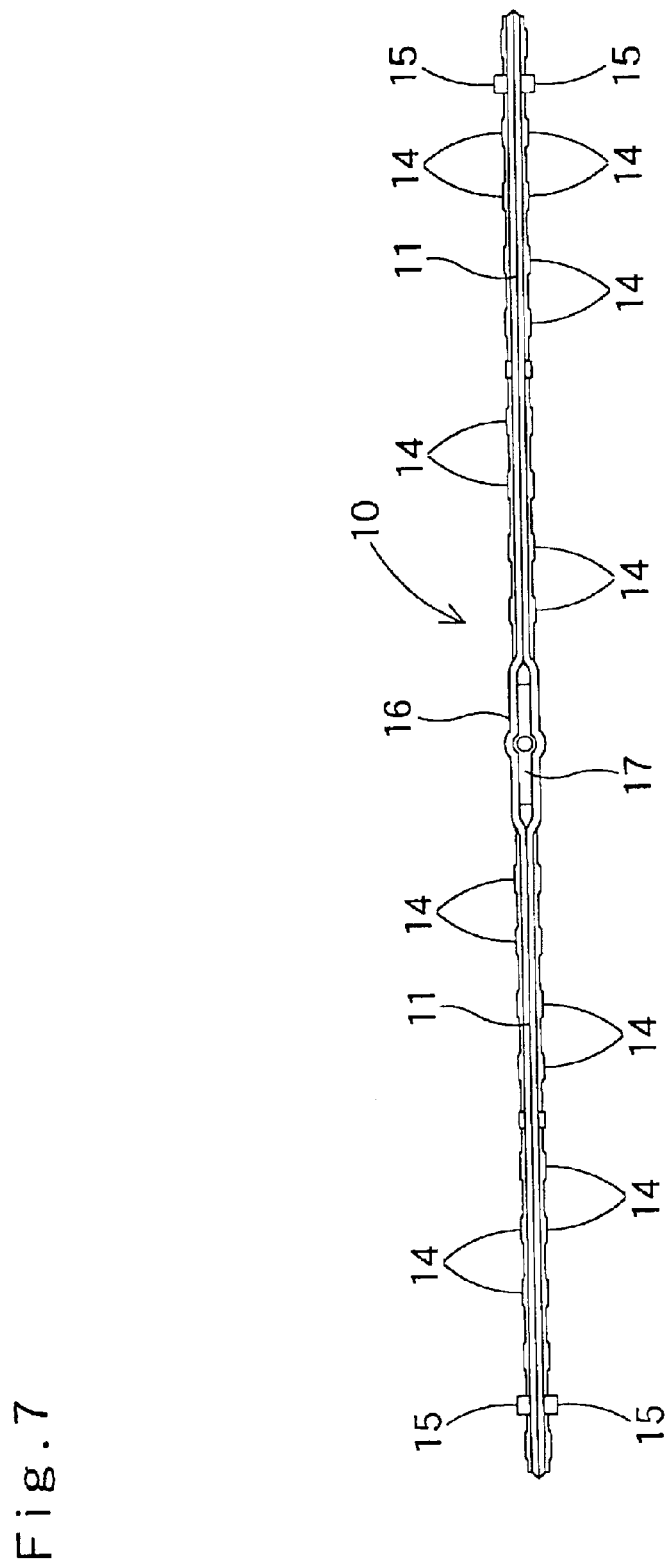
FIG. 7 is a plan view of an expanded state of the seal member 10.
Figure 8:
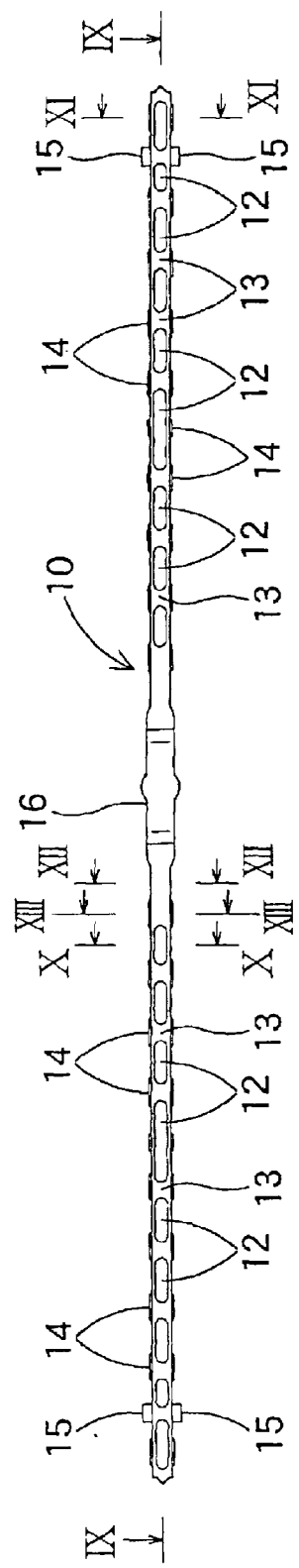
FIG. 8 is a bottom elevational view of the expanded state of the seal member 10.

The groove 2a is formed along the peripheral edge portion of the valve holder 2 on the same cross sectional surface. However, as shown in FIG. 5, a deeper groove 2b is formed in a leading end portion of the groove 2a, and a center wide portion 16 of the seal member 10 as shown in FIG. 6 is fitted into the deep groove 2b in the leading end portion. Further, rectangular recess portions 2c as shown in FIG. 5 are formed near both end portions of the groove 2 formed in the peripheral edge portion of the valve holder 2, and convex portions 15 provided in a protruding manner in side portions of both end portions in the seal member 10 are fitted to the recess portions 2c (FIG. 2).

The seal member 10 fitted and attached to the groove 2a of the peripheral edge portion in the valve holder 2 is formed in a string shape by a rubber high polymer elastic body, as shown in FIGS. 6 and 7 to 13, and has a fitting and attaching portion 10a in a base portion (an inner peripheral portion side at the attaching time). A leading end seal portion 11 having an approximately semicircular cross sectional shape is continuously formed in a side of an outer peripheral portion (a side of a seal). Further, a center wide portion 16 is formed in a center portion fitted and attached to the deep groove 2b of the leading end portion of the valve holder 2, and the convex portions 15 are provided in a protruding manner in both sides near both end portions. The seal member 10 is securely positioned in a longitudinal direction by fitting the convex portions 15 in both ends and the center wide portion 16.

Further, a plurality of recess portions 12 open to a bottom surface side are formed in a longitudinal direction in the fitting and attaching portion 10a fitted and attached to the groove 2a of the valve holder 2 in the seal member 10 in a state of being sectioned by a plurality of ribs 13. Further, low convex portions 14, which have a height of about 0.5 mm and a convex shape, are provided in both side portions of the seal member 10 in parallel in a longitudinal direction in a spaced state.

Figure 9:
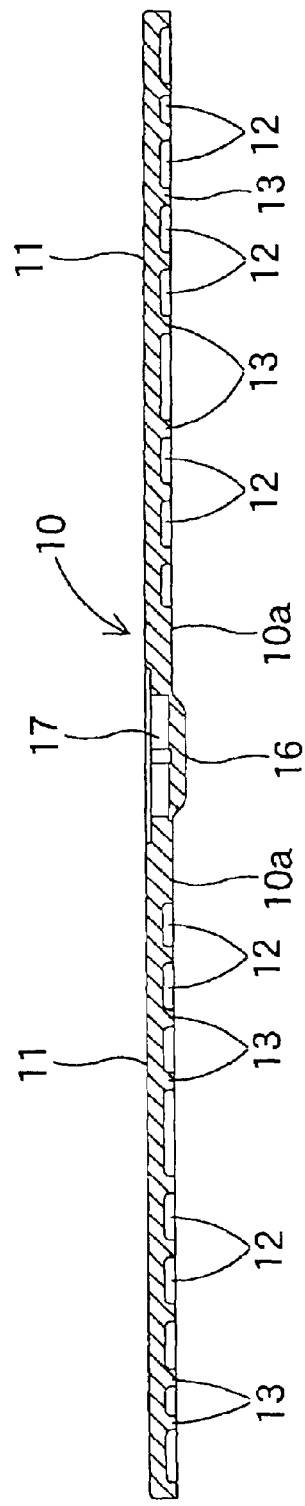
FIG. 9 is a cross sectional view along a line IX—IX in FIG. 8.
Figure 10:
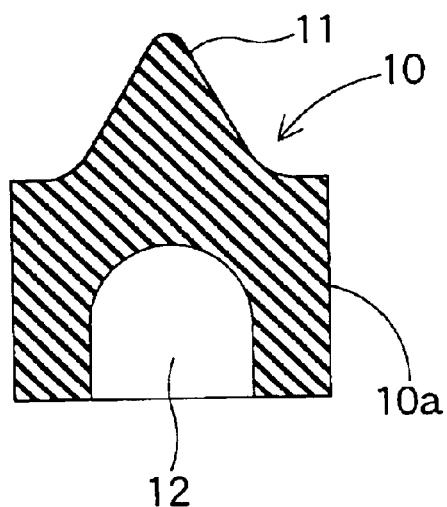
FIG. 10 is an enlarged cross sectional view along a line X—X in FIG. 8.
Figure 11:
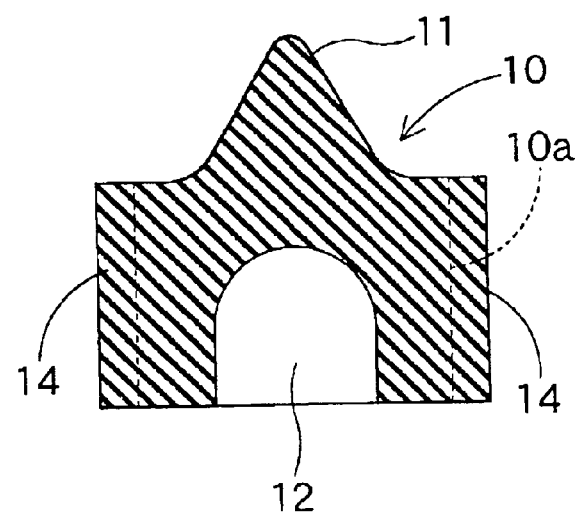
FIG. 11 is an enlarged cross sectional view along a line XI—XI in FIG. 8.
Figure 12:
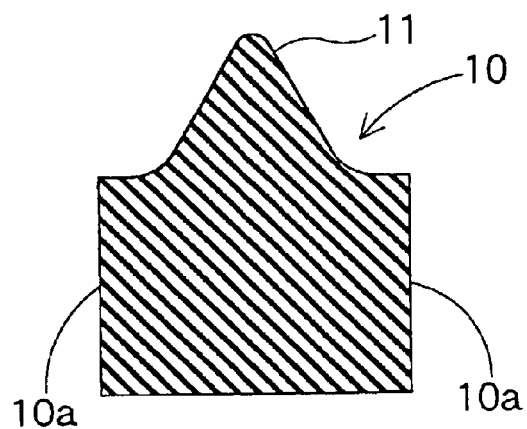
FIG. 12 is an enlarged cross sectional view along a line XII—XII in FIG. 8.
Figure 13:
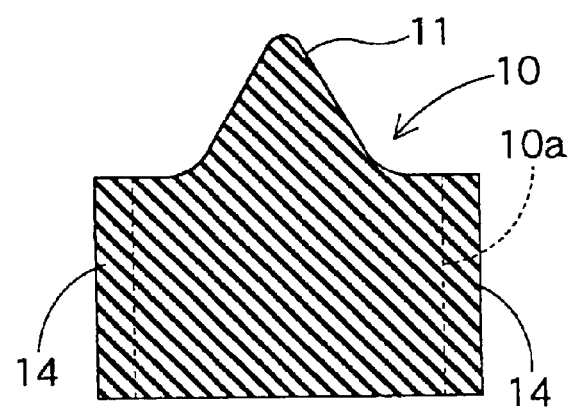
FIG. 13 is an enlarged cross sectional view along a line XIII—XIII in FIG. 8.

Further, near both end portions of the seal member 10, the engagement convex portions 15 are provided in a protruding manner in both sides, and the engagement convex portions 15 are fitted to the fitting recess portion 2c integrally formed with the groove 2a of the valve holder 2. In an inner side of the center wide portion 16 of the seal member 10, as shown in FIG. 9, a groove-like center recess portion 17 is formed in an outer side thereof (an outer peripheral side), and a width of the fitting and attaching portion 10a including the center wide portion 16 of the seal member 10 is set to be slightly larger than a width of the groove 2a.

Accordingly, the structure is made such that the seal member is well fitted and inserted into the center deep groove 2b of the valve holder 2 so as to be held within the center deep groove 2b, by making a repulsion force suitably small at a time of fitting the center wide portion 16.

Figure 4:
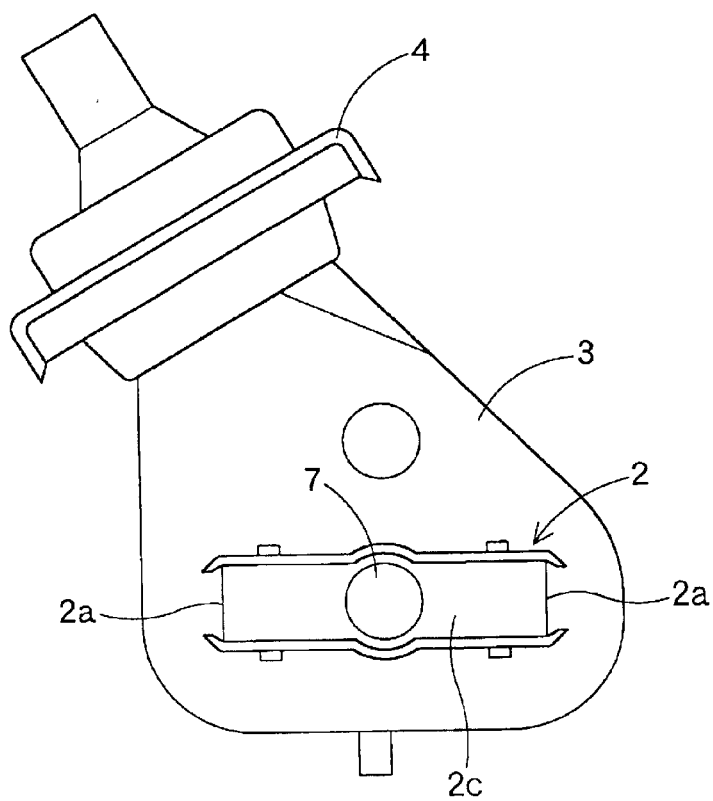
FIG. 4 is a right side elevational view of a state in which a seal member 10 of a valve holder 2 is taken out.

Since the width of the fitting and attaching portion 10a is formed slightly larger than the width of the groove 2a, the seal member 10 structured in the manner mentioned above is fitted into the groove 2a of the outer peripheral portion in the valve holder 2 as shown in FIGS. 4 and 5 in such a manner as to press (pressure insert). At this time, since the center wide portion 16 is formed in a center of the seal member 10, the center wide portion 16 is first fitted to the deep groove 2b of the leading end in a side of the valve holder 2, and the engagement convex portions 15 near both ends are fitted to the fitting recess portions 2c in the side of the valve holder, in a state of slightly pulling both ends of the seal member 10. Accordingly, it is possible to accurately position the seal member 10 in the longitudinal direction.

Figure 3:
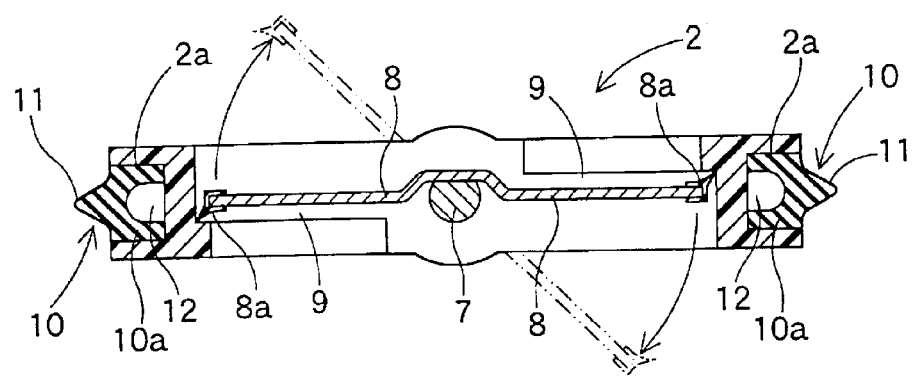
FIG. 3 is an enlarged cross sectional view along a line III—III in FIG. 2.

Further, the seal member 10 is fitted and attached in such a manner as to press the entire fitting and attaching portions 10a to the groove 2a. At this time, since the recess portions 12 open to the inner side of the groove 2a at a time of being fitted and attached are provided in parallel in the longitudinal direction in a state of being sectioned by the ribs 13, and the low convex portions 14 are formed in both sides of the fitting and attaching portions 10a in a spaced manner, the fitting and attaching portions 10a of the seal member 10 can well be fitted and attached to the groove 2a so as to be held within the groove 2a by a suitable elastic force. Accordingly, it is possible to prevent the seal member 10 from falling away. As mentioned above, in a state in which the seal member 10 is fitted and attached to the groove 2a of the valve holder 2, the leading end seal portion 11 of the seal member 10 becomes in a state of protruding to the outer peripheral portion of the valve holder 2, as shown in FIGS. 2 and 3.

The intake control valve 1 in which the seal member 10 is attached to the valve holder 2 is inserted and attached from the opening portion 29 provided in the end portion of the surge tank 20 into the communication hole 24 formed in the end portion of the partition wall 21 in an inner side of the opening portion 29, as shown in FIG. 14, in such a manner as to fit the valve holder 2 to the communication hole 24, and is fixed to the end portion of the surge tank 20 in a state in which the mounting portion 3 of the intake air control valve 1 seals up the opening portion 29.

At a time of fitting the valve holder 2 into the communication hole 24, the valve holder 2 is fitted to the communication hole 24 in such a manner that the outer peripheral portion of the leading end seal portion 11 of the seal member 10 is brought into contact with the groove portion in the peripheral edge portion of the communication hole 24 with a proper elastic force and a good sealing property is obtained. It is possible to prevent an excessive reaction force from being generated within the groove 2a of the valve holder 2 holding the fitting and attaching portion 10a in the base portion of the seal portion 10, owing to the following reasons.

In other words, when the valve holder 2 is fitted and attached to the communication hole 24 of the partition wall 21, the reaction force generated in the fitting and attaching portion 10a of the seal member 10 is properly reduced by a lot of recess portions 12 provided from a bottom portion to an inner portion of the seal member, and is kept in a proper magnitude by the ribs 13 provided between the recess portions 12.

Accordingly, when fitting the valve holder 2 to the communication hole 24, the valve holder 2 is not deformed by an excessive reaction force applied from the seal member 10, and a proper attachment holding force is generated between the fitting and attaching portion 10a of the seal member 10 and the groove 2a, whereby it is possible to prevent the seal member 10 from falling away due to the vibration or the like.

The intake air control valve 1 attached to the surge tank 20 is structured such that the diaphragm type actuator 4 is connected to the intake air branch pipe 22 or 23 via the control valve, and the control valve is connected to an engine control circuit, whereby the intake air control valve 1 is controlled so as to be opened and closed in correspondence to the operation state of the internal combustion engine.

For example, as long as the internal combustion engine is operated at a low speed under a high load, the intake air control valve 1 is controlled so as to close the valve body 8 in accordance with the driving of the actuator, whereby a node of a columnar vibration generated by the intake air pulsation forms a branch portion 27 within the surge tank 20, a vibration frequency generated by the intake air pulsation becomes comparatively low, a charging efficiency of the intake air is increased by an intake air inertia effect in the case that the engine speed is low, and an axial torque of the engine is improved.

On the other hand, as long as the internal combustion engine is operated at a high speed under a low load, the intake air control valve 1 is controlled so as to open the valve body 8, whereby the node of the columnar vibration generated by the intake air pulsation forms opening ends of the intake air branch pipes 22 and 23 within the surge tank 20, the vibration frequency generated by the intake air pulsation becomes comparatively high, the charging efficiency of the intake air is increased by an intake air inertia effect in the case that the engine speed is high, and the axial torque of the engine is improved.

As described above, in accordance with the intake air control valve of the present invention, since the recess portions are sectioned by a plurality of ribs so as to be arranged in parallel in the longitudinal direction, in the fitting and attaching portion of the seal member fitted and attached to the groove of the peripheral edge portion of the valve holder, the fitting and attaching portion is held within the groove in a fitted and attached state with a proper elastic force. Therefore, it is possible to prevent the seal member from falling away due to the vibration or the like. Further, an elastic force of the seal member, that is, a reaction force applied to the valve holder by the seal member, at a time when the fitting and attaching portion is fitted and attached to the inner side of the groove or at a time when the valve holder is fitted to the communication hole, is reduced to a suitable magnitude by the recess portions and the ribs arranged between the recess portions. Accordingly, at a time of fitting the valve holder into the communication hole, the valve holder is not deformed by the reaction force applied by the seal member. Therefore, it is possible to prevent the valve holder from being deformed, it is possible to hold the seal member in the proper seal position, and it is possible to secure a high sealing property at a time when the valve body within the valve holder is fully closed.

Further, in the case of the structure in which the deep groove is formed in the leading end portion of the valve holder, and the center wide portion provided in the center portion of the seal member is fitted and attached to the deep groove, it is possible to easily attach the seal member to the proper position, it is possible to hold the proper position of the seal member and it is possible to prevent the seal member from biasing and falling away due to the vibration or the like. Further, since the low convex portions having the small height and the convex shape are provided in both side portions of the seal member in parallel in the longitudinal direction in the spaced manner, it is possible to further improve the attaching property of the seal member. Further, in the case of the structure in which the engagement convex portions are provided in a protruding manner near both end portions of the seal member, and the engagement convex portions are fitted to the fitting recess portion extended in the groove of the valve holder, it is possible to easily attach the seal member to the proper position, and it is possible to prevent the seal member from biasing and falling away due to the vibration or the like.

What is claimed is:

1. An intake air control valve comprising:
   (a) a valve holder fitted and inserted to a communication hole formed in a partition wall separating a surge tank chamber arranged within a surge tank of a multiple cylinder internal combustion engine;
   (b) a valve body attached via a valve shaft so as to freely open and close a valve hole formed within said valve holder; and
   (c) a seal member fitted to a groove formed in a peripheral edge portion of said valve body,
   wherein said seal member is formed by a fitting and attaching portion fitted and attached to the groove of said valve holder, and a leading end seal portion brought into contact with an inner peripheral portion of the communication hole of said partition wall, and recess portions open to an inner side of said groove are provided in parallel in a longitudinal direction in said fitting and attaching portion so as to be separated by a plurality of ribs.

2. An intake air control valve as claimed in claim 1, wherein a deep groove is formed in a leading end portion of said valve holder, and a center wide portion provided in a center portion of said seal member is fitted and attached to said deep groove.

3. An intake air control valve as claimed in claim 1, wherein low convex portions having a small height and a convex shape are provided in both side portions of said seal member in parallel in a longitudinal direction in a spaced manner.

4. An intake air control valve as claimed in claim 1, wherein engagement convex portions are provided in a protruding manner near both end portions of said seal member, and said engagement convex portions are fitted to a fitting recess portion extended in the groove of said valve holder.

5. A seal member fitted to a groove formed in a peripheral edge portion of a valve body of an intake air control valve, said intake air control valve comprising, a valve holder fitted and inserted to a communication hole formed in a partition wall separating a surge tank chamber arranged within a surge tank of a multiple cylinder internal combustion engine, and a valve body attached via a valve shaft so as to freely open and close a valve hole formed within said valve holder,
   wherein said seal member comprises a fitting and attaching portion fitted and attached to the groove of said valve holder, and a leading end seal portion brought into contact with an inner peripheral portion of the communication hole of said partition wall, and recess portions open to an inner side of said groove are provided in parallel in a longitudinal direction in said fitting and attaching portion so as to be separated by a plurality of ribs.

6. A seal member as claimed in claim 5, wherein a center wide portion attached and fitted to a deep groove formed in a leading end portion of said valve holder is provided in a center portion.

7. A seal member as claimed in claim 5, wherein low convex portions having a small height and a convex shape are provided in both side portions in parallel in a longitudinal direction in a spaced manner.

8. A seal member as claimed in claim 5, wherein engagement convex portions fitted to a fitting recess portion extended in the groove of said valve holder are provided in a protruding manner near both end portions.

* * * * *